(12) United States Patent
Donetti et al.

(10) Patent No.: US 12,065,199 B2
(45) Date of Patent: Aug. 20, 2024

(54) USER INTERFACE ACTUATOR FOR A PILOT-BY-WIRE SYSTEM

(71) Applicant: Aktiebolaget SKF, Gothenburg (SE)

(72) Inventors: Luca Donetti, Turin (IT); Franco Lambertino, Turin (IT); Fortunato Pepe, Utrecht (NL)

(73) Assignee: Aktiebolaget SKF, Gothenburg (SE)

( * ) Notice: Subject to any disclaimer, the term of this patent is extended or adjusted under 35 U.S.C. 154(b) by 965 days.

(21) Appl. No.: 16/987,882

(22) Filed: Aug. 7, 2020

(65) Prior Publication Data

US 2021/0009191 A1 Jan. 14, 2021

Related U.S. Application Data

(63) Continuation of application No. 14/951,497, filed on Nov. 25, 2015, now abandoned.

(30) Foreign Application Priority Data

Nov. 28, 2014 (IT) .......................... TO2014A000995

(51) Int. Cl.
*B62D 5/00* (2006.01)
*B62D 5/04* (2006.01)
*B62D 15/02* (2006.01)

(52) U.S. Cl.
CPC ............. *B62D 5/006* (2013.01); *B62D 5/049* (2013.01); *B62D 15/0215* (2013.01)

(58) Field of Classification Search
CPC .... B62D 5/006; B62D 5/0457; B62D 5/0481; B62D 5/049; B62D 15/021; B62D 15/0215
See application file for complete search history.

(56) References Cited

U.S. PATENT DOCUMENTS

| | | | | |
|---|---|---|---|---|
| 5,554,969 A * | 9/1996 | Eguchi | ................... | B62D 5/049 180/236 |
| 6,422,336 B1 * | 7/2002 | Abele | ..................... | G01L 3/104 180/446 |
| 6,799,654 B2 * | 10/2004 | Menjak | .................. | B62D 5/006 180/402 |
| 6,865,463 B2 * | 3/2005 | Suzuki | ..................... | B62D 6/10 180/443 |
| 6,892,605 B2 * | 5/2005 | Menjak | .................. | B62D 5/006 74/552 |

(Continued)

FOREIGN PATENT DOCUMENTS

DE 19834868 A1 2/2000
DE 19914383 A1 10/2000
(Continued)

*Primary Examiner* — Kevin Hurley
*Assistant Examiner* — Michael R Stabley
(74) *Attorney, Agent, or Firm* — GARCIA-ZAMOR INTELLECTUAL PROPERTY LAW, LLC; Ruy Garcia-Zamor

(57) ABSTRACT

A user interface actuator for a pilot-by-wire system comprises a rotary electric motor having an output shaft suitable to be connected to a rotating user interface, a first absolute angular sensor for detecting in direct drive the number of revolutions of the shaft and a second absolute angular sensor redundant with respect to the first absolute angular sensor.

20 Claims, 3 Drawing Sheets

(56) References Cited

U.S. PATENT DOCUMENTS

| | | | |
|---|---|---|---|
| 7,295,905 B2* | 11/2007 | Yao | B62D 5/006 |
| | | | 701/1 |
| 7,772,836 B2* | 8/2010 | Isobe | B62D 15/0215 |
| | | | 324/207.2 |
| 2006/0196722 A1* | 9/2006 | Makabe | B62D 5/0481 |
| | | | 180/443 |
| 2009/0183588 A1* | 7/2009 | Hebenstreit | B62D 1/16 |
| | | | 74/492 |
| 2011/0127093 A1* | 6/2011 | Koga | B62D 11/003 |
| | | | 180/6.24 |
| 2012/0105057 A1* | 5/2012 | Mol | G01D 5/145 |
| | | | 324/251 |
| 2012/0116717 A1* | 5/2012 | Satou | G01D 5/24457 |
| | | | 702/151 |
| 2013/0289826 A1* | 10/2013 | Yoshitake | B62D 5/049 |
| | | | 701/42 |
| 2016/0200355 A1* | 7/2016 | Mori | B62D 5/0484 |
| | | | 180/446 |
| 2016/0216168 A1* | 7/2016 | Itomi | B62D 6/10 |

FOREIGN PATENT DOCUMENTS

| | | |
|---|---|---|
| DE | 10038167 A1 | 2/2002 |
| EP | 1225419 A2 | 7/2002 |
| EP | 1332946 A2 | 8/2003 |
| EP | 1409326 A1 | 4/2004 |
| EP | 2383167 A1 | 11/2011 |
| EP | 2738067 A1 | 6/2014 |
| JP | 2009248660 A | 10/2009 |
| KR | 20140101097 A | 8/2014 |
| WO | 9931792 A1 | 6/1999 |

* cited by examiner

USER INTERFACE ACTUATOR FOR A PILOT-BY-WIRE SYSTEM

CROSS REFERENCE TO RELATED APPLICATIONS

This application is a continuation of and claims priority to and benefit of U.S. patent application Ser. No. 14/951,497 filed on Nov. 25, 2015, which claims the benefit of Italy (IT) Patent Application Number TO2014A000995, filed on Nov. 28, 2014, which are incorporated herein by reference in their entirety.

TECHNICAL FIELD OF THE INVENTION

The present invention relates to a user interface actuator for a pilot-by-wire system. The piloting can be achieved by means of the steering of the wheels in a land vehicle, or by means of the rudder or rotation of the propulsion propellers in case of boats.

PRIOR ART

From EP-A1-1409326 it is known to associate an electronically controlled friction brake to a steering wheel for varying a braking torque acting on the steering wheel thus giving the feel of steering to the user. In particular, the braking torque can be controlled electronically and increase until defining an angular stop for the steering wheel.

A zero angular position of the steering wheel, referring to the condition wherein the wheels are straight, is floating and is updated by means of an electronic control.

The document EP-A1-1332946 describes an actuator for a steering wheel comprising a rotary motor connected in series with a steering column by means of a transmission. The steering column rotates as a result of the action of a user on the steering wheel and/or as a result of the action of the actuator, in particular a rotary electric motor, on the steering column.

The actuator comprises a brake of magnetorheological material to define a maximum angular stroke of the steering wheel. In parallel to the brake, angular mechanical stops are provided. The actuator also comprises angular position sensors to measure the deviation of the steering wheel from the zero position, and a control unit of the electric motor programmed to guide the steering wheel to the zero position. The actuator further comprises a spring mechanism to return the steering wheel to zero position. In particular, the angular sensors are redundant and both arranged downstream to the transmission with respect to the electric motor.

The known devices can be improved with regard to the positioning of the angular sensors so that the latter can support more thorough diagnostics of the actuator.

JP-A-2009248660 discloses an actuator according to the preamble of claim 1. Such actuator comprises redundant angular sensors and may be improved to detect possible malfunctioning of a transmission angularly coupling the angular sensors.

SUMMARY OF THE INVENTION

The object of the present invention is to solve the drawback specified above.

The purpose of the present invention is achieved by an actuator, wherein the actuator includes:
a rotary electric motor having an output shaft suitable to be connected to a rotating user interface;
a first angular sensor for detecting in direct drive the number of revolutions of the output shaft; and
a second angular sensor, which is redundant with respect to the first angular sensor,
wherein the first angular sensor and second angular sensor are absolute angular sensors;
by comprising a transmission having a non-unitary gear ratio and connected to the electric motor; in that the first angular sensor and the second angular sensor are connected to each other by the transmission and coupled according to the non-unitary gear ratio, the transmission being suitable to connect the electric motor to the rotating user interface in a rotational manner;
in that the transmission comprises an endless flexible member; and
an electronic control unit programmed to detect a deviation from the non-unitary gear ratio of first and second absolute angular sensor and generate a signal when the deviation is above a threshold.

BRIEF DESCRIPTION OF THE DRAWINGS

Further characteristics and advantages of the present invention will become clear from the following example description of a non-limiting embodiment, provided with reference to the accompanying drawings, wherein.

DETAILED DESCRIPTION OF THE INVENTION

Figure 1:
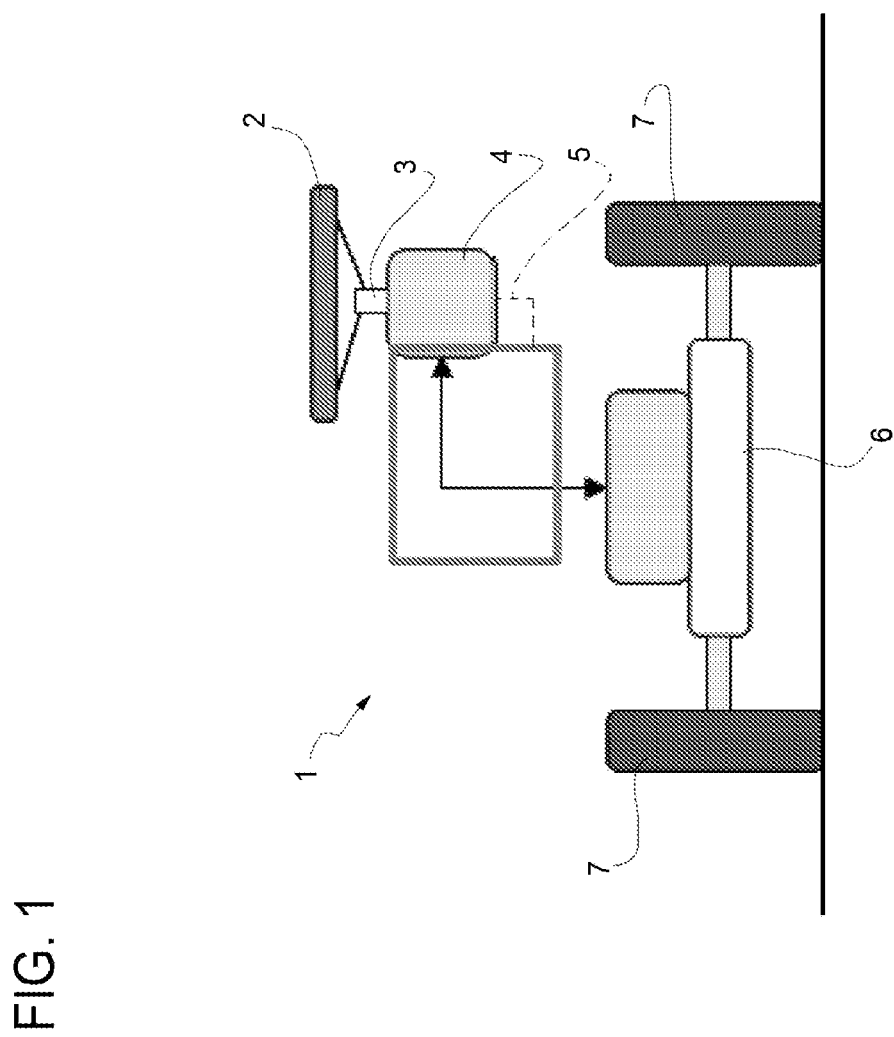
FIG. 1 schematically illustrates a steering system.

In FIG. 1 is illustrated with 1, as a whole, a piloting system for a transport means, in particular a steering by-wire system for a ground vehicle. The piloting system 1 comprises a user interface 2, for example a steering wheel, a steering column 3 connected torsional to the steering wheel 2 so that the steering wheel 2, operated by a user, causes a rotation of the steering column 3, an actuator 4 acting on the steering column 3 and a electronic control unit 5 (shown schematically in FIG. 1) to control the actuator 4 and to control the angular position of the steering wheel 2.

The pilot-by-wire system 1 also comprises a steering actuator acting on the steering wheels 6 and 7 controlled by a respective electronic control unit (known and not illustrated), which moves the steered wheels 7 and is connected with the electronic control unit 5 so as to be operated for performing the movement on the basis of the angular position of the steering wheel 2.

Figure 2:
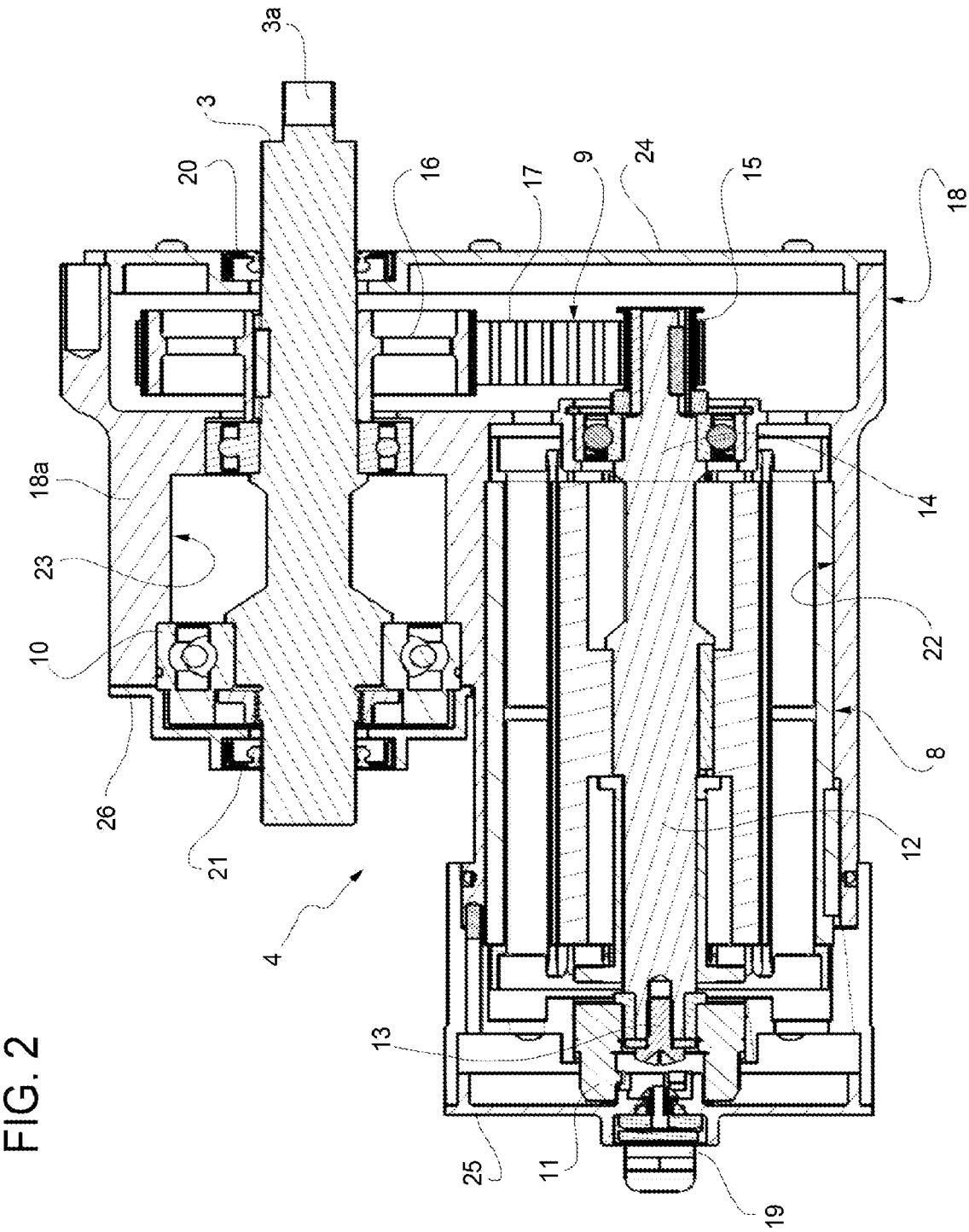
FIG. 2 is a section along a longitudinal plane, of an actuator according to the present invention.

FIG. 2 illustrates a first embodiment of the actuator 4. The actuator 4 of FIG. 2 comprises a rotary electric motor 8 and a transmission 9 to connect in series the rotary motor 8 to the steering column 3 and having a non-unitary gear ratio. Preferably the transmission 9 is a transmission synchronous with an endless flexible element, i.e. belt or chain.

The actuator 4 also comprises a first absolute angular sensor 10 to measure the position of the steering column 3 at a 360° revolution and a second absolute angular sensor 11 to measure the position of an output shaft 12 of the rotary motor 8 at a 360° revolution. The absolute angular sensors 10, 11 may be dedicated or integrated in plain bearings or rolling bearings and are coupled in data exchange with the electronic control unit 5. Preferably, the output shaft 12 is a through shaft with respect to a stator of the motor 8 and comprises a first end portion 13 connected to the sensor 11 and a second end portion 14 connected to the transmission 9. The end portions 13, 14 are longitudinally opposite. Alternatively, the sensor 11 may be arranged on the same side of the transmission 9 and thus allowing, in this way, a reduction of overall dimensions in the direction parallel to that of an axis of the output shaft 12.

Preferably, the transmission 9 is a speed reduction transmission of the shaft 12 and comprises a pinion 15 rigidly connected to the end portion 14, a toothed pulley 16 and a belt 17 for connecting the pinion 15 and the toothed pulley 16.

According to the embodiment of FIG. 2, the actuator 4 further comprises the pinion 3 and an anti-contaminant sealed casing 18 for housing the rotary motor 8, the steering column 3 parallel to the shaft 12 and the transmission 9. In this case, the absolute angular sensor 10 is also housed in the casing 18 and is integrated in a support bearing of the steering column 3. Furthermore, out from the casing 18 is an electrical connection output 19 for data transmission and power wires towards the electronic control unit 5, and a portion 3a of the steering column 3 to be connected to the steering wheel 2. The portion 3a comes out from the casing 18 which, in order to prevent the entering of contaminants, carries a seal 20, in particular a lip seal. The output 19 is preferably arranged on the cover 24 or 25 adjacent to the absolute angular sensor 11. In the non-limiting example of FIG. 2 the output 19 is carried by the cover 25.

It is possible that the steering column 3 comes out from the casing 18 also from the opposite axial end of the portion 3a (FIG. 2) and, in this case, a further seal 21 prevents the entering of contaminants into the casing 18.

Preferably, the casing 18 comprises a body 18a defining a seat 22 for the rotary motor 8 and a seat 23 for the steering column 3. The seats 22, 23 are through seats and the casing 18 comprises a single cover 24 adjacent to the transmission 9 for closing both seats 22, 23 on one side; and respective covers 25, 26 to close the seats 22, 23 at the axial portion opposite to the single cover 24. Preferably, the single cover 24 supports the seal 20, the cover 26 supports the seal 21 and the cover 25 carries the output 19. At least one of the covers 24, 25, 26 further carries an air exchange valve to drain moisture and allow the balance of pressure with the outside environment.

From the moment the absolute angular sensors 10, 11 are angularly coupled by means of a non-unitary gear ratio and defined in the design step, it is possible to program the electronic control unit 5 to detect the absolute angular position of the steering wheel 2 in an interval of several revolutions of the steering wheel 2. In particular, since the pinion 15 has 'm' teeth and the pulley 16 has 'n' teeth, the range of revolutions of the steering wheel within which it is possible to determine the absolute position is defined by the least common multiple between 'm' and 'n' divided by 'm'. For example, if 'm'=15 and 'n'=17, the range within which it is possible to calculate the absolute position of the steering column 3 is 17 revolutions. If 'm'=20 and 'n'=40, the range within which it is possible to calculate the absolute position of the steering column 3 is 2 revolutions. This allows programming of the electronic control unit 5 so that more than one revolution of the steering wheel 2 corresponds to the maximum stroke of the steered wheels 7. This example is useful for applications requiring particularly accurate steering adjustments.

Furthermore, once the non-unitary gear ratio of the transmission 9 is known, the electronic control unit 5 can be programmed to generate a warning signal when a deviation from the transmission ratio between the sensors 10, 11 exceeding a predefined limit value and eventually programmable is detected. For example, the deviation can be in phase and/or in frequency. In this way the user can be alerted for example for the breaking of the belt 17 or for displacement of the belt 17 on the pinion 15.

The electric motor 8 is controllable so as to generate a braking torque and, where necessary, blocking the rotation of the steering column 3.

Figure 3:
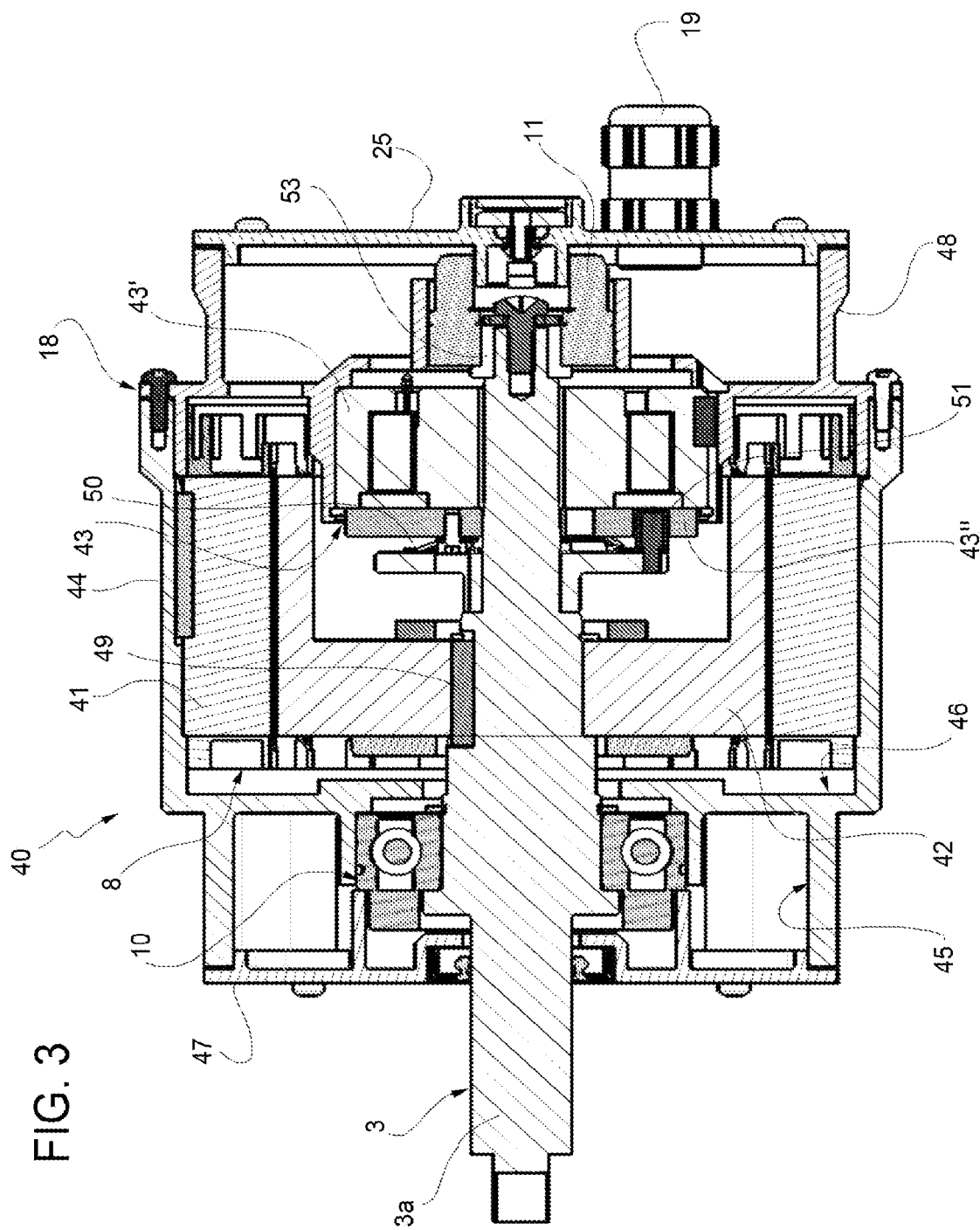
FIG. 3 is a section along a longitudinal plane, of an actuator according to a preferred embodiment of a user interface actuator for a pilot-by-wire system.

FIG. 3 illustrates an actuator 40 according to a preferred embodiment of a user interface actuator for a pilot-by-wire system for the description of which, elements functionally identical to those of the actuator 4 will be indicated with the same reference numbers already used in the previous paragraphs.

The actuator 40 comprises a rotary motor 8 having a stator 41 fixed to the casing 18 and a hollow rotor 42. The steering column 3 is fixed to the rotor 42 and is surrounded both by the latter and by the stator 41 so that the motor 8 is in direct drive. Preferably, the steering column 3 is fixed to the rotor 42 by means of a coupling 49 such as a key, a tab, a grooved coupling or the like. When the steering column 3 is in direct drive on the rotor 42, the transmission ratio is unitary and excluding the transients in a condition of constant torque.

The actuator 40 also comprises a brake 43 controlled by the electronic control unit 5 acting on the steering column 3. The brake 43 comprises an electromagnetic drive means 43' fixed to the casing 18 and a friction disc 43" driven by the drive means 43' and connected to the steering column 3 for transmitting rotation and in a movable way, to axial translation. For example, the disc 43" is connected in a torsional elastic manner to the steering column 3 by means of a flat spring 50 interposed between the disc 43" and the steering column 3. The flat spring 50 applies to the disc 43" both an axial load to allow the disc 43" to return to the rest condition when the brake 43 is not active, and a torsional load. The torsional deformation of the flat spring 50 allows a rotation of few degrees between the disc 43" and the steering column 3. The disc 43" is also driven in an axial direction by means of pins 51 put in rotation by the steering column 3. Preferably, the pins 51 comprise a rubber cover, or of other elastic or viscoelastic equivalent material, to suppress any contact noise; the pins 51 are compressed during relative angular rotation between the disc 43" and the steering column 3. The relative rotation of the disc 43" with respect to the steering column 3 when the brake 43 is closed is detected by the absolute angular sensors 10, 11 and the electronic control unit 5 is programmed so that the brake 43 is opened after having been closed when the rotation of the steering column 3 with respect to the disc 43" is detected. Advantageously, the brake 43 is surrounded by the rotor 42 and/or by the stator 41 so as to reduce the axial dimension of the actuator 40 (FIG. 3).

The steering column 3 is also monitored by means of the absolute angular sensors 10, 11. In particular, the sensor 10 is arranged axially between the rotor 42 and the portion 3a and the sensor 11 is arranged axially between the brake 43 and the cover 25 provided with the connector 19.

According to the embodiment of FIG. 3, the casing 18 comprises a body 44 defining a coaxial seat 45 and a seat 46. The seat 45 houses the sensor 10 which, preferably, is integrated in a rolling bearing mounted for radially and axially supporting the steering column 3. The seat 45 is sealingly closed by a cover 47 supporting the seal 20. The seat 46 houses the stator 41 and the rotor 42 and the steering column 3 is passing through the seats 45, 46.

The casing 18 also comprises a support 48 fixed to the body 44 and configured to carry the drive means 43' and the absolute angular sensor 11. Preferably, the support 48 defines respective seats to radially support the drive means 43' and the absolute angular sensor 11. The absolute angular sensor 11 may be integrated in a bearing radially supporting the steering column 3 from the opposite axial side of the absolute angular sensor 10.

The casing 18 is closed by the cover 25 fixed to the support 48 on the axial side opposite to the cover 47.

It may be provided that the steering column 3 of the actuator 40 is a torsionally rigid body for connecting one to the other the two sensors 10, 11 so that the electronic control unit 5 will not register phase shifts in use, as illustrated in FIG. 3. It is also possible that the absolute angular sensors 10, 11 are mechanically connected by means of an elastic torsional coupling or a coupling defining a circumferential clearance so that the detecting of the sensors 10, 11 is phase-shifted on the basis of the module and/or the direction of the torque applied to the steering column 3 by the user. Also in the case, the absolute angular sensors 10, 11 are in direct drive on the steering column 3 since the effect of the elastic coupling or of the coupling with circumferential clearance exert its effect in the transients due to the change of module and/or the reversal of the torque transmitted. In addition, the absolute angular sensors 10, 11 are connected in direct drive even when they are rigidly connected but not directly to the steering column 3 and/or to the shaft 12. For example, in FIG. 3, the absolute angular sensor 11 is mounted directly on the steering column 3 by means of a bushing 53 or other equivalent support element. By means of the detecting of the deviation in phase and/or in frequency between the signals of the absolute angular sensor 10, 11, the electronic control unit 5 may detect a possible mounting defect of the sensor 11 and/or a damage or breakage of the bushing 53. Similarly, in FIG. 2, also the sensors 10, 11 are in direct drive respectively on the steering column 3 and on the shaft 12.

The advantages that the actuator 4, 40 allows to obtain are as follows.

By monitoring in direct drive the absolute angular sensors 10, 11 to the shaft 12 and to the rotor 42 it is possible to allow a diagnosis comprising also the electric motor 8. In addition, during normal operation, the sensors 10, 11 are redundant in order to allow the operation of the actuator 4, 40 in case one of the sensors is faulty. During normal operation the electronic control unit 5 can be programmed to apply a driving torque on the steering column 3 and return the steering wheel 2 to the zero position. It is also possible to program the electronic control unit 5 so that the steering wheel 2 is being driven in an angular position assigned. The assigned angular position can be predefined in the design step or may be calculated by the control electronic unit 5 in real time, for example, to return the steering wheel 2 in a position representative of the instantaneous angular position of the wheels 7.

When the actuator 4 comprises the transmission 9 and the absolute angular sensors 10, 11 are connected to each other by means of the transmission 9, it is possible to immediately detect a malfunction of the transmission 9, such as rupture or any displacements of the belt 17 by means of the combination of the signals generated by the sensors 10, 11 with the transmission ratio of the transmission 9. In normal operating conditions, in fact, the signal generated by the sensor 10 and that generated by the sensor 11 differ by the transmission ratio of the transmission 9 and any deviation, in particular a macroscopic deviation in phase and/or frequency, is an indicator of malfunction. For example if the belt 17 were to break, the signal of the sensor 10 and of the sensor 11 would be completely uncorrelated, and this can be detected by the electronic control unit 5 and cause the signaling of an error.

When it is possible to employ an electric motor having a relatively low maximum torque and amplified by transmission 9, as in the example of FIG. 2, it is possible that a braking or blocking torque of the steering column 3 is generated by an electronic control of the electric motor 8, for example, the electronic control unit 5, on the basis of the state parameters of the vehicle, such as instant speed, steering angle of the wheels 7, or others, and/or dynamic parameters of the vehicle such as mass, position of the gravity center or others.

The actuator of FIG. 3, being mounted in direct drive on the steering column 3, requires a torque such as to require radial dimensions of the rotor 42 relatively high and such as to provide a cavity in the rotor 42, which can be used for housing the brake 43 controlled by the electronic control unit 5. The brake 43 may be dry friction, as in FIG. 3, fluid friction, as in the case of a magnetorheological brake. Even the brake 43 can be controlled by the electronic control unit 5 exclusively, or in combination with the stator 41 to generate a braking torque variable and/or a blocking torque applied to the steering column 3 according to the same criteria already described for the actuator 4.

Clearly, modifications or variations can be applied to the actuator 4, 40, according to the present invention, without departing from the protective scope as defined by the appended claims.

For example the steering column 3 can be a shaft as illustrated in figures or it may comprise a more complex mechanism, possibly comprising a transmission, to connect the portion 3a to the steering wheel 2.

It is possible that the actuators 4, 40 do not comprise the steering column 3 but a coupling suitable to receive the steering column, for example a grooved coupling. In this case, the sensor 10 can be connected to the toothed pulley 16 or to the rotor 42. The sensor 11 may be mounted on a bushing connected in a rigid manner to the rotation, for example by means of a tab, a key or a grooved coupling, to the column. In this way an actuator having a particularly compact configuration can be obtained.

What is claimed is:

1. A user interface actuator for a pilot-by-wire system, the user interface actuator comprising:
   a rotary electric motor having an output shaft suitable to be connected to a rotating user interface;
   a first angular sensor configured to detect in direct drive the number of revolutions of the output shaft, the output shaft having an axial end portion;
   a second angular sensor, which is redundant with respect to the first angular sensor;
   wherein the first angular sensor and the second angular sensor are absolute angular sensors, the second angular sensor being located on the axial end portion of the output shaft of the rotary electric motor;
   a casing containing the rotary electric motor, the first angular sensor, and the second angular sensor, the casing comprising a body;
   a transmission having a non-unitary gear ratio and connected to the rotary electric motor, the first angular sensor and the second angular sensor being connected to each other by the transmission and coupled according to the non-unitary gear ratio,; the transmission being suitable to connect the rotary electric motor to the rotating user interface in a rotational manner, in that the transmission comprises an endless flexible member;

a steering column engaged with the endless flexible member, the steering column having first and second steering column axial ends which each extend outside of the casing;

a bearing supporting the steering column, the first angular sensor being integrated into the bearing, an outer surface of the bearing abutting the casing; and an electronic control unit programmed to detect a deviation from the non-unitary gear ratio of the first and second angular sensors and generate a signal when the deviation is above a threshold, and wherein the first angular sensor is positioned on the steering column at an axial side of the transmission opposite to an end of the steering column configured to engage the user interface.

2. The user interface actuator of claim 1, wherein the electronic control unit is programmed to combine respective signals from the first angular sensor and the second angular sensor to obtain an absolute angular signal of the rotating user interface over a range of several revolutions, calculated by determining a least common multiple of "M" teeth of a pinion and "N" teeth of a pulley of the transmission and dividing the least common multiple by the "M" teeth of the pinion.

3. The user interface actuator of claim 1, wherein the steering column and the electric motor are mechanically connected via the output shaft of the electric motor and the endless flexible member.

4. The user interface actuator of claim 3, wherein the first angular sensor is integrated into an outer ring of the bearing so as to abut the casing.

5. The user interface actuator of claim 4, wherein the casing forms an annular shoulder, the bearing with the first angular sensor being seated in the annular shoulder which is located on a first casing side which is separated from a second casing side, which is proximate a user interface, by the endless flexible member.

6. A user interface actuator for a pilot-by-wire system, the user interface actuator comprising:

a rotary electric motor having an output shaft suitable to be connected to a rotating user interface a first angular sensor configured to detect in direct drive the number of revolutions of the output shaft, the output shaft having an axial end portion, a second angular sensor, which is redundant with respect to the first angular sensor;

wherein the first angular sensor and the second angular sensor are absolute angular sensors, the second angular sensor being located on the axial end portion of the output shaft of the rotary electric motor;

a casing containing the rotary electric motor, the first angular sensor, and the second angular sensor, the casing comprising a body;

a transmission having a non-unitary gear ratio and connected to the rotary electric motor, in that the first angular sensor and the second angular sensor are connected to each other by the transmission and coupled according to the non-unitary gear ratio, the transmission being suitable to connect the rotary electric motor to the rotating user interface in a rotational manner, in that the transmission comprises an endless flexible member;

a steering column engaged with the endless flexible member;

a bearing supporting the steering column, the first angular sensor being integrated into the bearing, an outer surface of the bearing abutting the casing; and an electronic control unit programmed to detect a deviation from the non-unitary gear ratio of the first and second angular sensors and generate a signal when the deviation is above a threshold, wherein the steering column and the electric motor are mechanically connected via the output shaft of the electric motor and the endless flexible member, wherein the first angular sensor is integrated into an outer ring of the bearing so as to abut the casing, wherein the casing forms an annular shoulder, the bearing with the first angular sensor being seated in the annular shoulder which is located on a first casing side which is separated from a second casing side, which is proximate a user interface, by the endless flexible member, and wherein the rotary electric motor is located axially along the output shaft between the endless flexible member and the second angular sensor.

7. The user interface actuator of claim 6, wherein the steering column has first and second axial ends, the first and second axial ends each protruding from an opposite side of the casing, the first and second axial ends having first and second seals, respectively, between the first and second axial ends and the casing.

8. A user interface actuator for a pilot-by-wire system, the user interface actuator comprising:

a rotary electric motor having an output shaft;

a first angular sensor configured to detect in direct drive the number of revolutions of the output shaft, the output shaft having an axial end portion;

a second angular sensor, which is redundant with respect to the first angular sensor;

wherein the first angular sensor and the second angular sensor are absolute angular sensors;

a casing containing the rotary electric motor, the first angular sensor, and the second angular sensor, the casing comprising a body;

a transmission having a non-unitary gear ratio and connected to the rotary electric motor, in that the first angular sensor and the second angular sensor are connected to each other by the transmission and coupled according to the non-unitary gear ratio, the transmission being suitable to connect the rotary electric motor to the rotating user interface in a rotational manner, in that the transmission comprises an endless flexible member;

a steering column engaged with the endless flexible member, the steering column having first and second steering column axial ends which each extend outside of the casing;

a bearing supporting the steering column, the first angular sensor being integrated into the bearing, an outer surface of the bearing abutting the casing; and an electronic control unit programmed to detect a deviation from the non-unitary gear ratio of the first and second angular sensors and generate a signal when the deviation is above a threshold, wherein the second angular sensor is located on an axial end of the output shaft opposite the transmission.

9. The user interface actuator of claim 8, wherein the steering column and the electric motor are mechanically connected via the output shaft of the electric motor and the endless flexible member.

10. The user interface actuator of claim 9, wherein the first angular sensor is integrated into an outer ring of the bearing so as to abut the casing.

11. The user interface actuator of claim 10, wherein the casing forms an annular shoulder, the bearing with the first angular sensor being seated in the annular shoulder which is located on a first casing side which is separated from a second casing side, which is proximate a user interface, by the endless flexible member.

12. The user interface actuator of claim 11, wherein the rotary electric motor is located axially along the output shaft between the endless flexible member and the second angular sensor.

13. The user interface actuator of claim 12, wherein the steering column has first and second axial ends, the first and second axial ends each protruding from an opposite side of the casing, the first and second axial ends having first and second seals, respectively, between the first and second axial ends and the casing.

14. A user interface actuator for a pilot-by-wire system, the user interface actuator comprising:
    a rotary electric motor having an output shaft, the output shaft having an axial end;
    a first angular sensor configured to detect in direct drive the number of revolutions of the output shaft, the output shaft having an axial end portion;
    a second angular sensor, which is redundant with respect to the first angular sensor;
    wherein the first angular sensor and the second angular sensor are absolute angular sensors, the second angular sensor being located on the axial end portion of the output shaft of the rotary electric motor;
    a casing containing the rotary electric motor, the first angular sensor, and the second angular sensor, the casing comprising a body, an electrical connection output being positioned outside the casing;
    a transmission connecting the first angular sensor to the second angular sensor, the transmission being suitable to transmit force from the rotary electric motor to the rotating user interface, the transmission comprising an endless flexible member;
    an electrical connection output positioned in a coaxial fashion on the axial end of the output shaft opposite from the transmission,
    a steering column engaged with the endless flexible member;
    a bearing supporting the steering column, the first angular sensor being integrated into the bearing; and
    an electronic control unit programmed to detect a deviation of the first and second angular sensors and generate a signal when the deviation is above a threshold.

15. The user interface actuator of claim 14, wherein the steering column and the electric motor are mechanically connected via the output shaft of the electric motor and the endless flexible member.

16. The user interface actuator of claim 14, wherein the first angular sensor is integrated into an outer ring of the bearing, the outer ring into which the first angular sensor is integrated abuts the casing.

17. The user interface actuator of claim 14, wherein the casing forms an annular shoulder, the bearing with the first angular sensor being seated in the annular shoulder which is located on a first casing side which is separated from a second casing side, which is proximate a user interface, by the endless flexible member.

18. The user interface actuator of claim 14, wherein the rotary electric motor is located axially along the output shaft between the endless flexible member and the second angular sensor.

19. The user interface actuator of claim 14, wherein the steering column has first and second axial ends, the first and second axial ends each protruding from an opposite side of the casing, the first and second axial ends having first and second seals, respectively, between the first and second axial ends and the casing.

20. The user interface actuator of claim 14, wherein the electronic control unit is programmed to combine respective signals from the first angular sensor and the second angular sensor to obtain an absolute angular signal of the rotating user interface over a range of several revolutions, calculated by determining a least common multiple of "M" teeth of a pinion and "N" teeth of a pulley of the transmission and dividing the least common multiple by the "M" teeth of the pinion.

* * * * *